May 18, 1937.  W. H. GALLAWAY  2,081,006
GROUND GLASS FOCUSING ATTACHMENT
Filed Sept. 23, 1936
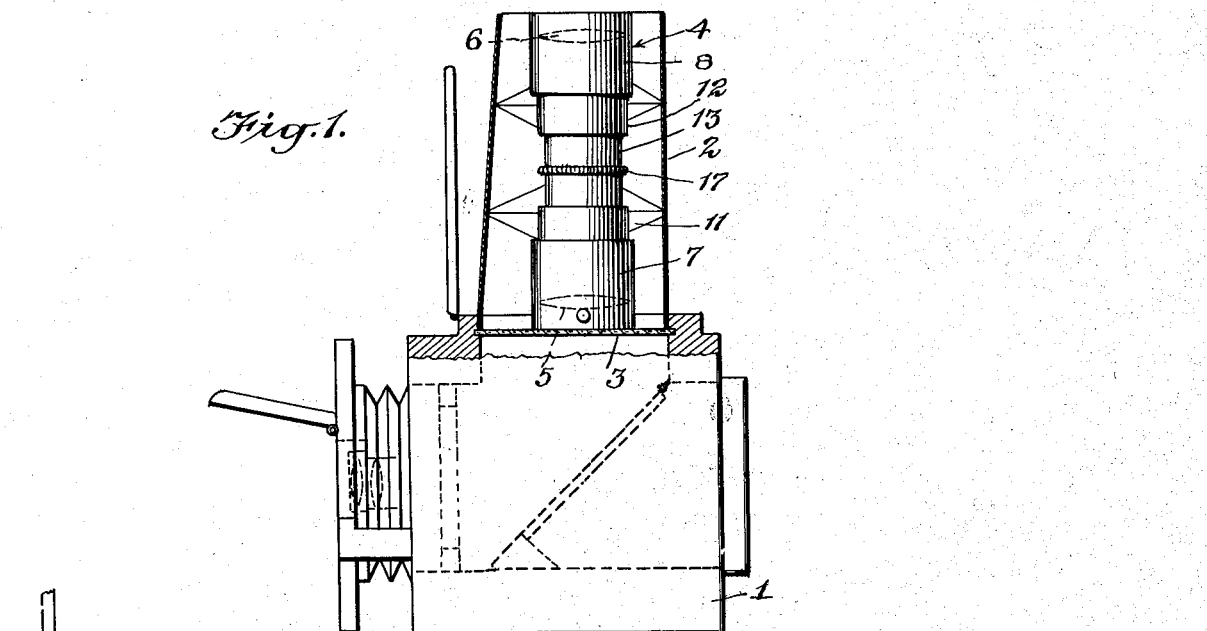
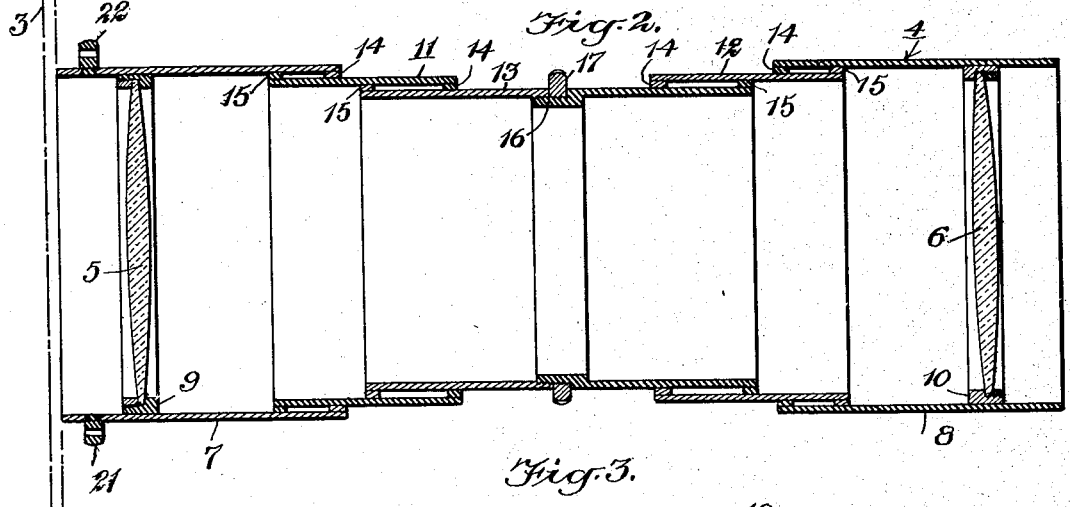
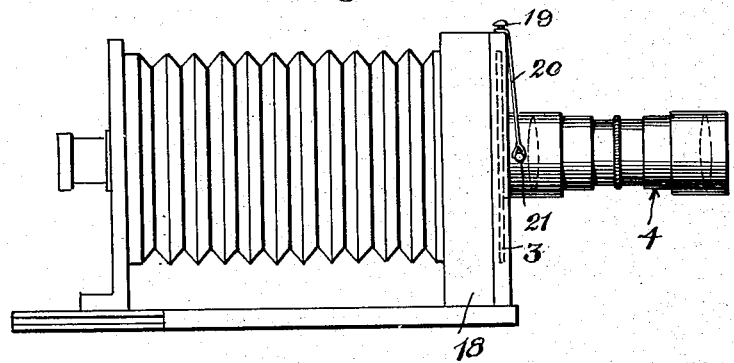
WITNESSES
INVENTOR
William H. Gallaway
BY
Munn Anderson & Liddy
ATTORNEYS Patented May 18, 1937

2,081,006

UNITED STATES PATENT OFFICE 2,081,006

GROUND GLASS FOCUSING ATTACHMENT

William H. Gallaway, White Plains, N. Y.

Application September 23, 1936, Serial No. 102,089

1 Claim. (Cl. 95—44)

This invention relates to an attachment for cameras or other instruments used in focusing on ground glass, an object being to provide an attachment wherein an image out of focus may be enlarged and thereby readily observed.

Another object of the invention is to provide an enlarging device for enlarging an image on ground glass, the structure being such as to be readily used on different kinds of cameras so that accuracy in focusing may be secured.

An additional object, more specifically, is to provide an enlarging attachment for cameras and other devices wherein a pair of convex lenses are presented and telescoping supporting members used whereby the device may be brought in contact with a ground glass and then shifted to correctly focus the lenses on the glass and permit an observer to see whether or not the image on the glass is sharp.

In the accompanying drawing:

Fig. 1 is a side view of a camera with certain parts in section and with an attachment embodying the invention applied thereto;

Fig. 2 is a longitudinal vertical sectional view through the attachment shown in Fig. 1, the same being on an enlarged scale;

Fig. 3 is a side view of a different form of camera to that shown in Fig. 1 together with an attachment embodying the invention.

Referring to the accompanying drawing by numerals, 1 indicates a camera of a desired kind. The camera shown in Fig. 1 is a camera known as a reflex camera and is provided with the usual hood 2 as well as the ground glass 3. The parts described are old and well known and are used when the camera is being focused on a given object. During the focusing of the camera a person looks downwardly through the hood or bellows 2 so as to observe the image on the ground glass 3. Certain parts of the camera are adjusted until the image appears sharp to the observer. The camera is then actuated to take the picture. As the image is necessarily rather small, quite often accurate focusing can not be secured, and consequently the picture when taken will be out of focus more or less. To correct this to an appreciable extent the attachment 4 is arranged as shown in Fig. 1 when a reflex camera is used. The attachment 4 is allowed to rest on the glass 3 and then the attachment is adjusted to secure the desired focus. This will secure an enlargement to the person using the device and he may readily observe whether or not the image is sharp.

The attachment 4 is shown more particularly in Fig. 2 which is a section which clearly shows the convex lenses 5 and 6 arranged adjacent the opposite ends of the attachment. These lenses are mounted in tubular casings 7 and 8 by suitable mountings 9 and 10 held in place in any suitable manner, as for instance by adhesive. The casings 7 and 8 form part of the telescoping support which includes auxiliary casings 11 and 12 and a central casing 13. These various casings are frictionally held against movement and are slightly spaced apart by the respective rings 14 and 15. The entire support may be made from metal, bakelite or other material. The central casing 13 is formed of two parts with one part having an exteriorly threaded flange 16 which carries a knurled ring 17.

When the parts are as shown in Fig. 2 a person using the device will look through the lens 6 and the vision will pass through lens 5 to the ground glass 3. If the lenses 5 and 6 are properly focused nothing more need be done, but if they are not properly focused the lenses are moved toward and from each other until the desired focus is secured. When a desired focus has been secured the device is usually left in that position and is used from time to time for inspecting images on the ground glass 3. It is not necessary for the device to cover the entire image on ground glass 3 as a portion of the image is sufficient. Preferably the device is placed over the center part of the image and then the camera is adjusted until the image appears very sharp when viewed through the lenses 5 and 6.

Instead of using the attachment with a reflex camera as shown in Fig. 1, it could be used with a studio or view camera as shown in Fig. 3. Camera 18 as shown in Fig. 3 may be of any desired kind of the type mentioned and may have one or more pins 19 mounted thereon so that the two strings or cables 20 may be connected thereto and to the ears 21 and 22 mounted on casing 7 as shown in Fig. 2. This will provide a desired support for the attachment 4 whereby a person may readily adjust the support to secure a sharp focus. After the image on the ground glass has been properly focused the attachment is preferably removed and the camera is then used in the usual way.

I claim:

A device for enlarging an image on the ground glass of a camera comprising a telescoping body adapted to have one end positioned against said ground glass and a double convex lens positioned interiorly and near each end of said body whereby upon adjusting said body to secure a desired focus of said lenses an observer may see the image on said ground glass in an enlarged condition, said body being formed with a central tubular casing constructed of two parts screwed together, an auxiliary casing for each of said two parts, said auxiliary casings being of greater diameter than said central casing, and a primary casing at each end of said body into which said auxiliary casings and said central casing are adapted to nest, said primary casings carrying said lenses.

WILLIAM H. GALLAWAY.